United States Patent
Marshall et al.

(10) Patent No.: US 6,515,660 B1
(45) Date of Patent: Feb. 4, 2003

(54) APPARATUS AND METHOD FOR DYNAMIC TRIANGLE STRIPPING

(75) Inventors: Carl S. Marshall; Michael S. MacPherson, both of Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/459,903

(22) Filed: Dec. 14, 1999

(51) Int. Cl.[7] ............................................. G06T 17/00

(52) U.S. Cl. ..................... 345/420; 345/423; 345/428

(58) Field of Search .............................. 345/428, 420, 345/422, 423

(56) References Cited

U.S. PATENT DOCUMENTS

| | | | |
|---|---|---|---|
| 5,720,019 A | 2/1998 | Koss et al. ................. | 395/134 |
| 5,812,136 A | 9/1998 | Keondjian .................. | 345/419 |
| 6,137,492 A | * 10/2000 | Hoppe ....................... | 345/420 |
| 6,307,558 B1 | * 10/2001 | Mao ........................... | 345/428 |

OTHER PUBLICATIONS

Hoppe, Hugues, "View–Dependent Refinement of Progressive Meshes," email: hhoppe@microsoft.com.
Foley, Computer Graphics Principles and Practice, Addison–Wesley, 2nd Edition, p. 474.*
Batt, Rusell H., "110583 SURFAC: Graphics Representation of Surfaces by Contour and Crosshatched Plots with Hidden Lines Removed," Oct. 1982.
Larkey, LaVina, DIGIMATION LICENSES INTEL ARCHITECTURE LABS 3D TECHNOLOGY—Multi–resolution Mesh Software Delivers Leading–Edge Technology to Game Developers, http://www.digimation.com/press/0399multires.htm.
Owen, Steve, "Mesh Generation: A Quick Introduction," http://www.andrew.cmu.edu/user/sowen/mintro.html.
"Pandemic Studios Breaks the LOD Barrier with Multi–Resolution Mesh Technology," Mar. 1999.
"Multi–Resolution Mesh in Dark Reign II," Mar. 18, 1999.
"Intel® 3D Software Technologies—Game Developer," *Intel Architecture Labs*, wysiwyg://10/http://www.intel.hu/ial/3dsoftware/gamedev.htm.
"Intel® Software Technologies—Multi–resolution," wysiwyg://6/http://www.intel.cl/ial/3dsoftware/mrm.htm.
"Intel® 3D Software Technolgies—Multi–resolution Mesh.".
"MultiRes," http://www.digimation.com/plugins/multires/bodymain.htm.
"Intel® 3D Software Technologies," wysiwyg://29/http://developer.intel.com/ial/3dsoftware.

* cited by examiner

*Primary Examiner*—Mark Zimmerman
*Assistant Examiner*—Sam A. Wiley
(74) *Attorney, Agent, or Firm*—Kenyon & Kenyon

(57) ABSTRACT

An apparatus and method is provided for creating a neighbor mesh from a multi-resolution mesh (MRM) representation of a triangulated model. The apparatus and method include computing neighbor data for the neighbor mesh at the highest resolution of the MRM, and creating the neighbor mesh using the computed neighbor data. The apparatus and method further include changing the resolution of the MRM and re-computing the neighbor data at the changed resolution of the MRM, and computing an updated neighbor mesh from the re-computed neighbor data.

20 Claims, 9 Drawing Sheets

CLOCKWISE TRIANGLE VERTEX SETS

COUNTER-CLOCKWISE TRIANGLE VERTEX SETS

APPARATUS AND METHOD FOR DYNAMIC TRIANGLE STRIPPING

FIELD OF THE INVENTION

The present invention relates generally to computer graphics. In particular, the present Invention relates to dynamically triangle stripping a multi-resolution mesh ("MRM") representation of a three-dimensional ("3-D") triangulated model.

BACKGROUND

Prior art approaches to increase the speed of rendering and displaying three dimensional objects have started with the properties of the polygons used to render an object. A common polygon used in rendering three dimensional objects is a triangle. A triangle has many helpful properties that make it ideal for use in rendering three dimensional surfaces. For example, a triangle is completely defined by three vertices and each triangle also uniquely defines a plane. Thus, many systems will use a plurality of triangles to render a three dimensional surface. If each triangle is passed separately to the graphic subsystem that renders the three dimensional object, then three vertices for each triangle must be passed and processed by the graphic subsystem. However, the number of vertices that must be passed and processed by the graphic subsystem can be reduced through "vertex sharing." Vertex sharing relies on a property of shared sides among triangles. Although it takes three vertices to define one triangle, it only takes four vertices to define two triangles if they share a common side. In order to take advantage of vertex sharing to reduce the number of vertices needed to render an object, pipelined systems have been developed that divide a three dimensional object into triangle strips that can then be processed and displayed efficiently In order to present a three-dimensional ("3-D") object on a display screen, typical computer graphics systems decompose the object into a plurality of graphics primitives. These primitives are the basic components of a graphics picture and may include points, lines, polylines, vectors and polygons, such as triangles or quadrilaterals. Typically, a hardware/software scheme is implemented to render, or draw, on the two-dimensional display screen, the graphics primitives that represent the view of one or more objects being represented on the screen.

In general, the primitives that define a 3-D graphic object are provided from a host computer, which defines each primitive in terms of primitive data. For example, when the primitive is a triangle, the host computer may define the primitive in terms of the x, y, z coordinates of its vertices, as well as the R, G, B color values of each vertex. Rendering hardware interpolates the primitive data to compute the display screen pixels that are turned on to represent each primitive, and the R, G, B values for each pixel.

A triangle strip (tri-strip) is a basic primitive that very efficiently represents the triangles (faces) of a mesh. A "mesh," as used in the present invention, is a representation of the surface area of an object by subdividing the surface area into triangle or quadrilateral shapes. For example, if there are ten triangles in a row, it would take thirty vertices (3 vertices per triangle*ten triangles) to represent these triangles as discrete elements within the 3-D object.

Triangle strips have been typically pre-computed for each mesh because current triangle stripping processes are too slow to be computed each time the mesh is rendered. As a result, this pre-computing technique does not work with Multi-Resolution Meshes ("MRMs") because the triangle strips have to be computed and stored for every possible resolution of the MRM, thus using far too much memory.

In a triangle mesh a "neighboring triangle" is any triangle that shares an edge with an adjacent triangle. Similarly, a "far corner" of a triangle is the corner in the neighboring triangle that is not on the edge that joins a triangle to its neighboring triangles. A "far vertex" is the vertex that defines the far corner.

Previous triangle mesh data structures were variable in size or limited to manifold meshes. In a "manifold" mesh each shared edge can only be shared between two triangles. These previous triangle mesh data structures also comprised triangle records that included individual pointers to the neighboring triangles and location information for each of the three corners/vertices of the triangle. As a consequence of these structures, all of the vertices in the triangle must be searched to find the far vertex, the size of the data structures is variable and usually larger which results in slower performance, and variable-sized sets of pointers were used to store the pointers to multiple neighbors in non-manifold meshes that shared an edge. In a "non-manifold mesh" at least one edge is shared by more than two triangles. While variable-sized sets of pointers are relatively easy to implement in software, they do not easily lend themselves to being implemented in hardware.

FIG. 7 illustrates an exemplary prior art triangle mesh data structure. In FIG. 7, an exemplary three triangle mesh 700 which is made up of triangles T1, T2 and T3 701, 702 and 703, respectively, is shown with the corners of each triangle labeled as C0, C1 and C2. A triangle mesh data structure 705 illustrates the interrelationships between triangle records 710, 720 and 730 which represent triangles T1 701, T2 702 and T3 703, respectively, of triangle mesh 700. Triangle record T1 710 is comprised of a triangle number field 711, a corner 0 field 712, a corner 1 field 713, a corner 2 field 714, a record header 715, a first neighboring triangle pointer 716, a second neighboring triangle pointer 717 and a third neighboring triangle pointer 718. Each of the pointers 716, 717 and 718 are used to point to the header record of a different neighboring triangle. For example, in FIG. 7, since triangle T1 701 and triangle T2 702 are neighbors, first neighboring triangle pointer 716 of triangle record T1 710 points to the record header 725 for triangle record T2 720. Similarly, first neighboring triangle pointer 726 of triangle record T2 720 points to the record header 715 for triangle record T1 710. Continuing, second neighboring triangle pointer 727 of triangle record T2 720 points to the record header 735 for triangle record T3 730 and first neighboring triangle pointer 736 of triangle record T3 730 points to the record header 725 for triangle record T2 720, since triangle T2 702 and triangle T3 703 are neighbors. The second and third neighboring triangle pointers 717 and 718, respectively, in triangle record T1 710 are null pointers since only one side of triangle T1 701 has a neighbor triangle, triangle B 702.

Selective refinement of an arbitrary progressive mesh according to changing view parameters is introduced by Hughes Hoppe in "View-Dependent Refinement of Progressive Meshes," SIGGRAPH 97.

A general representation of a pipeline system processing a triangle strip is described in U.S. Pat. No. 5,818,136 to Keondjian. This discussion highlights two hallmarks of prior art pipelined systems. First, the pipelined process always works on one vertex at a time, and for each vertex processed, after the first two vertices, a new triangle is drawn. Second, to maintain maximum performance, the pipeline must be provided with a steady stream of vertices and any breaks in the steady flow of vertices reduces system performance.

Therefore, it can be appreciated that a substantial need exists to provide an improved method and system for dynamic triangle stripping a MRM at run-time at rates at least as fast as standard computer display rates of 60 Hz.

SUMMARY OF THE INVENTION

Embodiments of the present invention provide a method for creating a neighbor mesh from a multi-resolution mesh. The method includes computing neighbor data for the neighbor mesh at a highest resolution of the multi-resolution mesh. The method further includes changing the resolution of the multi-resolution mesh and re-computing the neighbor data for the neighbor mesh at the changed resolution of the multi-resolution mesh, and computing an updated neighbor mesh from the re-computed neighbor data.

BRIEF DESCRIPTION OF THE DRAWINGS

The various features of the invention will best be appreciated by simultaneous reference to the description which follows and the accompanying drawings, in which.

DETAILED DESCRIPTION

Figure 1:
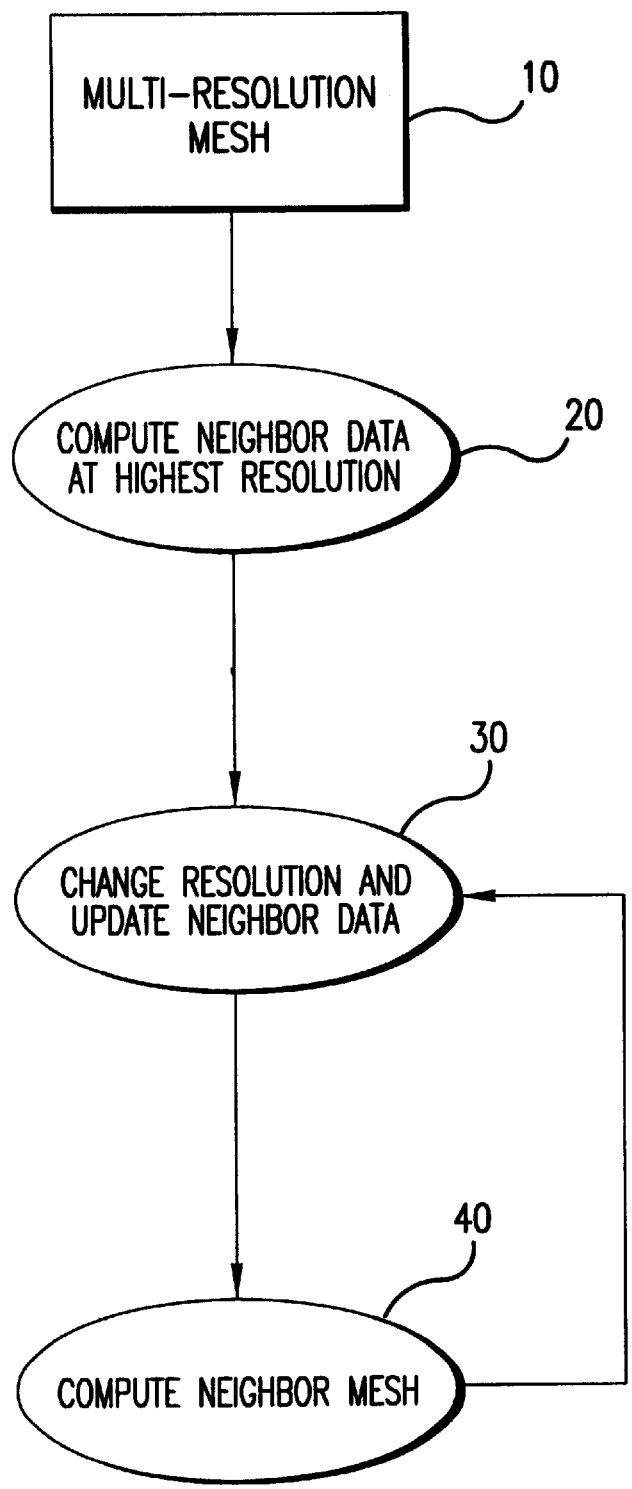
FIG. 1 illustrates a data flow diagram of the overall triangle stripping method in accordance with an embodiment of the present invention.

Embodiments of the present invention provide a method for dynamic triangle stripping of a multi-resolution mesh. The method includes computing neighbor data at the highest resolution for the multi-resolution mesh, and creating the dynamic triangle strip mesh using the computed neighbor data. The method further includes changing the resolution of the multi-resolution mesh and re-computing the neighbor data at the changed resolution for the multi-resolution mesh, and computing and rendering an updated dynamic triangle strip mesh from the re-computed neighbor data at data rates at least as fast as standard computer display rates of 60 Hz.

As used herein the term "face" can include any triangular surface in a MRM. It should be understood that a face can be represented by any polygon shape, for example, quadrilaterals or arbitrary polygons. Therefore, while the following description is based on triangle shaped faces, it is merely descriptive of one embodiment of the present invention and in no way limits the scope of the present invention.

Embodiments of the present invention implement dynamic triangle stripping of MRMs. "Dynamic" is used to mean that the mesh (a 3-D triangulated model) is triangle stripped every single frame at minimal cost. A triangle strip is a basic primitive that very efficiently represents the faces of a mesh as triangles. For example, if there are ten faces in a row, it would take thirty vertices (3 vertices per face*ten faces) to represent those faces as discrete triangles. To represent the same ten faces as a tri-strip, it would be N (Number of Faces)+2 vertices. Thus, in the optimal dynamic tri-stripping situation, it will take twelve vertices total to represent the same ten faces as a tri-strip. As a result, embodiments of the present invention are able to bring the performance advantages of tri-strips to the scalable technology of MRMs. In fact, an embodiment of the present invention is currently available in the "MultiRes Software Toolkit" from Digimation, Inc. of 107 Mallard Street, Suite D, St. Rose, Louisiana 70087 (http://www.digimation.com).

In order to use dynamic tri-stripping in a MRM, the mesh must be created with the following attributes. First, each triangle in the mesh is encoded with information about its three neighbors.

The information includes the position of the far vertex in each of the neighboring triangles and a flag indicating if the neighboring triangle meets all the material and smoothing group compatibility requirements for the triangle strip. This neighbor information is computed once for the entire mesh at it's highest resolution. The "resolution" of a mesh is defined by the number of faces (triangles) in the mesh, which is directly related to the level-of-detail of the mesh that is displayed. For example, an object that is depicted with 1,200 faces has a higher resolution than an object that is depicted with only 600 faces. In general, objects in the background, that is, furthest away from the camera, are depicted at lower resolutions. This is done to increase the rendering speed of the objects and allow for objects closer to the camera to be displayed at higher resolution. Another factor that can determine an objects resolution is the rate at which new frames can be displayed. If the frame rate drops below a threshold value, then the resolution of the model may be reduced to allow for an increase in the frame rate.

Second, after the neighbor information has been computed for the highest resolution, the neighbor information is then incrementally updated as triangles are removed or added to the mesh. These incremental updates are localized to a small number of adjacent faces. The triangle strips can now be computed by walking through the mesh data structure and using the flags in the mesh data structure (described below in relation to FIGS. 6, 8 and 9) to quickly check for compatible neighboring triangles. When the neighbor triangle is compatible with the current strip it can be added quickly to the triangle strip because the position of the far vertex is already encoded.

Once the input mesh for the triangle strips is created, then the dynamic tri-stripping can take place. The faces of a triangle strip must follow an alternating orientation pattern of clockwise then counter-clockwise. In one embodiment, the first face is always clockwise In another embodiment, the first face is always counterclockwise and the process detailed below must be modified accordingly.

The following is the process for dynamically triangle stripping a mesh with the first face being a clockwise face:

1. Get the first triangle of the mesh
2. Find if there are any neighboring triangles to that triangle that can be added to the triangle strip. (that is, neighboring triangles that have the same material and smoothing group).
3. If there are no neighboring triangles to be added, then end the triangle strip and go to step 8.
4. If there is a neighboring triangle that can be added, then reorder the first triangle in a clockwise orientation so that the edge of the second and third vertex match the edge of the new triangle, and add the far vertex of the new triangle to the triangle strip. (This new triangle is a counter-clockwise triangle.)
5. Get the last vertex added and select the clockwise neighboring triangle from that vertex. If there is a neighboring triangle that can be added, then add the far vertex of the neighboring triangle. By far vertex we mean the vertex that is not part of the edge shared between the two neighboring triangles. Next, find a counter-clockwise triangle.
6. If there is no clockwise neighboring triangle, then check for a counter-clockwise neighboring triangle. A repeated vertex must be inserted before the last vertex in the triangle strip to keep the alternating triangle orientation of the triangle strip. Next find a clockwise triangle.
7. Repeat steps 5 & 6 for each of the orientations.
8. End the triangle Strip, get the next unused triangle in the mesh to start the next tri-strip.
9. Repeat steps 2–8 until no more unused triangles exist in the mesh.

Each triangle strip can be submitted to a graphics Application Programming Interface (API) for rendering after it is created, or the triangle strips can be buffered and submitted all at once to the graphics API.

Figure 2:
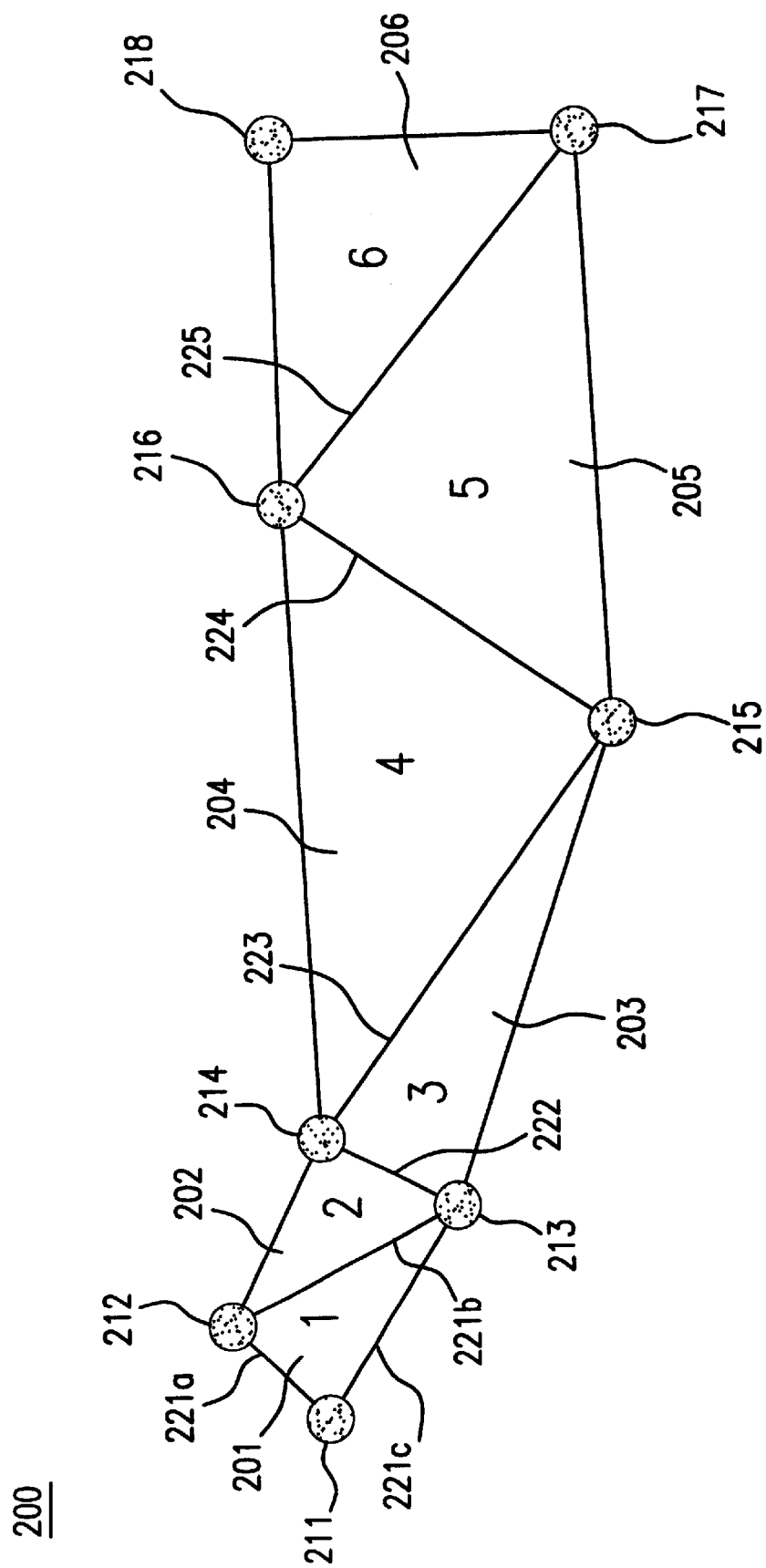
FIG. 2 illustrates an exemplary triangle strip used in accordance with an embodiment of the present invention.

FIG. 1 illustrates a data flow diagram of the overall triangle stripping method in accordance with an embodiment of the present invention. In block 10 a MRM representation of a 3-D object is received by the dynamic triangle stripping ("DTS") system. The MRM is made up of a plurality of triangle strips, such as is illustrated in FIG. 2, that represent each surface in the 3-D object and each triangle in each triangle strip has associated with it information about it's three neighboring triangles. "Neighboring triangles" are any two triangles that share a common edge. The information includes a pointer for each neighboring triangle, the position of the far vertex in each neighboring triangle in the MRM and a flag indicating if the neighboring triangle meets all the material and smoothing group requirements for the triangle strip. A "far vertex" is the vertex in a neighboring triangle that is not on the common edge that joins the two neighboring triangles. Returning to FIG. 1, in block 20 the initial neighbor information is computed for each triangle in each triangle strip in the MRM at the highest resolution of the MRM and this neighbor information is saved in a Neighbor Mesh Data Structure. In block 30, when the resolution of the MRM is changed, then the neighbor information is incrementally updated in the Neighbor Mesh Data Structure as triangles are removed or added to change the resolution of the mesh, however, the actual structure of the Neighbor Mesh Data Structure is not changed. These incremental updates are localized to a small number of adjacent faces. Regardless of whether the Neighbor Mesh Data Structure is changed or not, the triangle strips can now be computed very quickly because a single flag can be checked to determine if the next triangle is compatible with the current strip. When the neighboring triangle is compatible with the current strip it can be added to the tri-strip quickly because the position of the far vertex is already encoded. In block 40, the triangle strips are dynamically computed and rendered for the MRM and, then, processing loops back to block 30. Blocks 30 and 40 represent the processing executed at run-time to dynamically update the triangle strips. The block 40 processing is described in greater detail below in relation to FIG. 6.

FIG. 2 shows an exemplary triangle strip used in accordance with an embodiment of the present invention. Triangle strip 200 includes six triangles 1, 2, 3, 4, 5 and 6 201, 202, 203, 204, 205 and 206, respectively, defined by eight vertices 211, 212, 213, 214, 215, 216, 217 and 218 and thirteen edges between the eight vertices. In FIG. 2, triangle 1 201 includes vertices 211, 212 and 213 and edge 221a between vertex 211 and vertex 212, edge 221b between vertex 212 and vertex 213 and edge 221c between vertex 213 and vertex 211. Edges 221b, 222, 223, 224 and 225 are unique in that each of these edges is common to (that is, shared between) two adjacent triangles in FIG. 2. For example, edge 221b is shared between triangle 1 201 and triangle 2 202; edge 222 is shared between triangle 2 202 and triangle 3 203; edge 223 is shared between triangle 3 203 and triangle 4 204; edge 224 is shared between triangle 4 204 and triangle 5 205; and edge 225 is shared between triangle 5 205 and triangle 6 206.

Figure 3A:
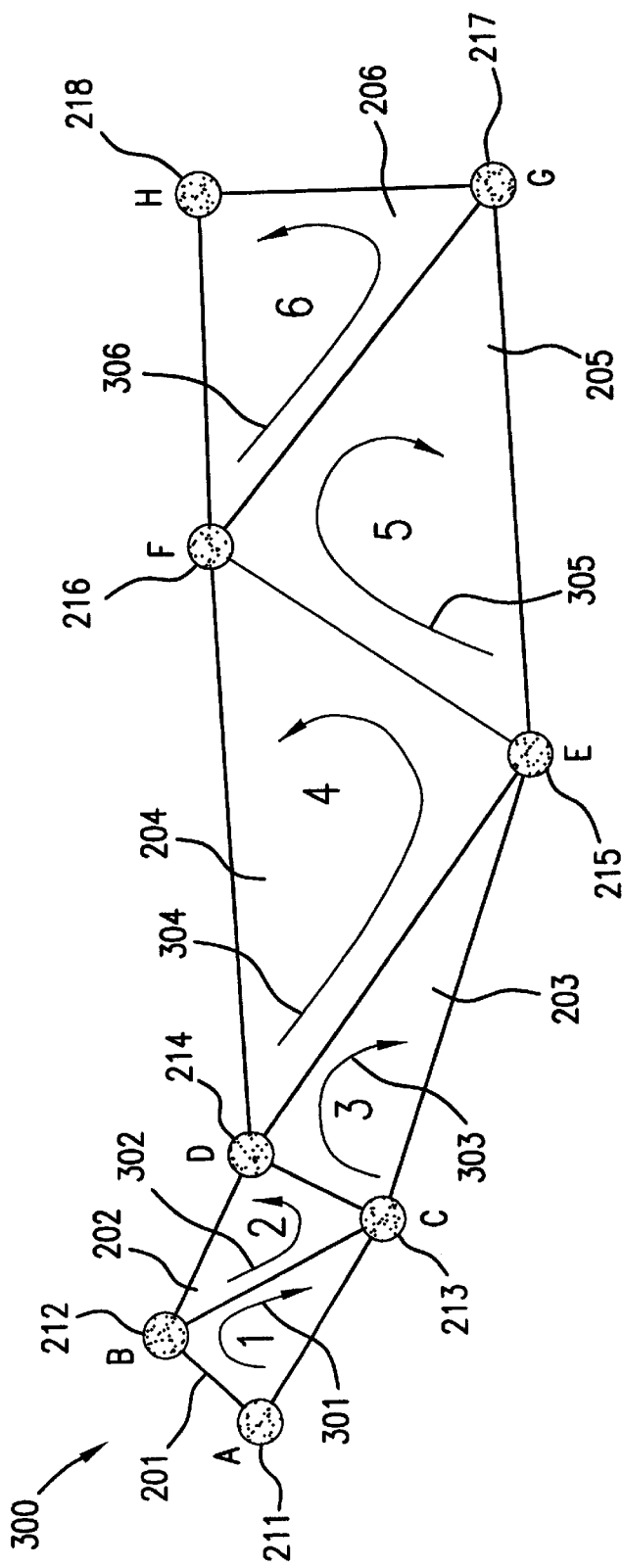
FIG. 3A illustrates the exemplary triangle strip of FIG. 2 showing the clockwise and counter-clockwise ordering of the vertices in the triangle strip in accordance with an embodiment of the present invention.
Figure 3B:
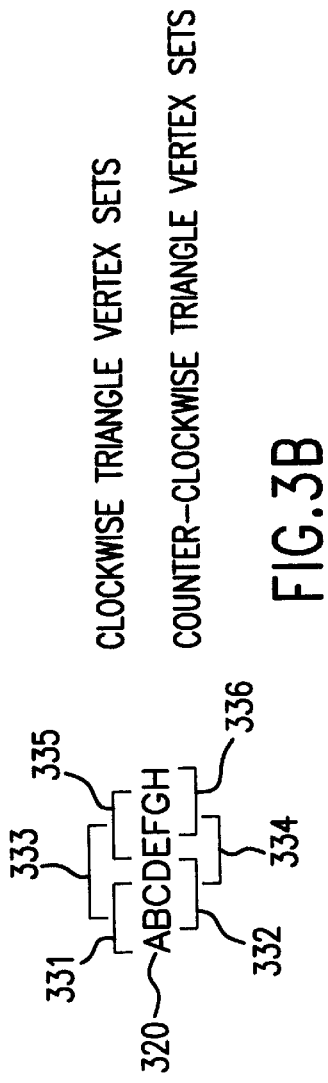
FIG. 3B illustrates the indexed vertex strip showing the clockwise and counter-clockwise ordering of the vertices in the triangle strip of FIG. 3A in accordance with an embodiment of the present invention.

FIG. 3A shows the clockwise and counter-clockwise ordering of the vertices in the triangle strip of FIG. 2 in accordance with an embodiment of the present invention. For the sake of consistency and clarity, the numbers used in FIG. 2 have been carried over in FIGS. 3A and 3B. In FIG. 3A, vertices A, B and C 211, 212 and 213, respectively, define the three corners of triangle 1 201 of triangle strip 300. Arrow 301 is curved in a clockwise direction to indicate the order that vertices A, B and C 211, 212 and 213, respectively, are stored in an indexed vertex strip as shown in FIG. 3B in accordance with an embodiment of the present invention. Bracket 331, shown over "ABC" in FIG. 3B, indicates the first triangle vertex set that defines and determines triangle 1 201 in the triangle strip 300. As required by an embodiment of the present invention, this first triangle is ordered in a clockwise direction. Returning to FIG. 3A, arrow 302 is curved in a counter-clockwise direction and indicates the order of vertices B, C and D 212, 213 and 214, respectively, which define the corners of triangle 2 202 and from which the next vertex in the indexed vertex strip is determined. In this case, the next vertex to be added to the indexed vertex strip in FIG. 3B is far vertex D 214. Bracket 332, shown below "BCD" in FIG. 3B, indicates the second triangle vertex set that defines and determines triangle 2 202 in the triangle strip 300. Returning to FIG. 3A, arrow 303 is curved in a clockwise direction and indicates the order of vertices C, D and E 213, 214 and 215, respectively, which define the corners of triangle 3 203 and from which the next vertex in the indexed vertex strip is determined. In this case, the next vertex to be added to the indexed vertex strip in FIG. 3B is far vertex E 215. Bracket 333, shown above "CDE" in FIG. 3B, indicates the third triangle vertex set that defines and determines triangle 3 203 in the triangle strip 300. Returning to FIG. 3A, arrow 304 is curved in a counter-clockwise direction and indicates the order of vertices D, E and F 214, 215 and 216, respectively, which define the corners of triangle 4 204 and from which the next vertex in the indexed vertex strip is determined. In this case, the next vertex to be added to the indexed vertex strip in FIG. 3B is far vertex F 216. Bracket 334, shown below "DEF" in FIG. 3B, indicates the fourth triangle vertex set that defines and determines triangle 4 204 in the triangle strip 300. Returning to FIG. 3A, arrow 305 is curved in a clockwise direction and indicates the order of vertices E, F and G 215, 216 and 217, respectively, which define the corners of triangle 5 205 and from which the next vertex in the indexed vertex strip is determined. In this case, the next vertex to be added to the indexed vertex strip in FIG. 3B is far vertex G 217. Bracket 335, shown above "EFG" in FIG. 3B, indicates the fifth triangle vertex set that defines and determines triangle 5 205 in the triangle strip 300. Returning to FIG. 3A, arrow 306 is curved in a counter-clockwise direction and indicates the order of vertices F, G and H 216, 217 and 218, respectively, which define the corners of triangle 6 206 and from which the next vertex in the indexed vertex strip is determined. In this case, the next vertex to be added to the indexed vertex strip in FIG. 3B is far vertex H 218. Bracket 336, shown below "FGH" in FIG. 3B, indicates the sixth triangle vertex set that defines and determines triangle 6 206 in the triangle strip 300.

Figure 4:
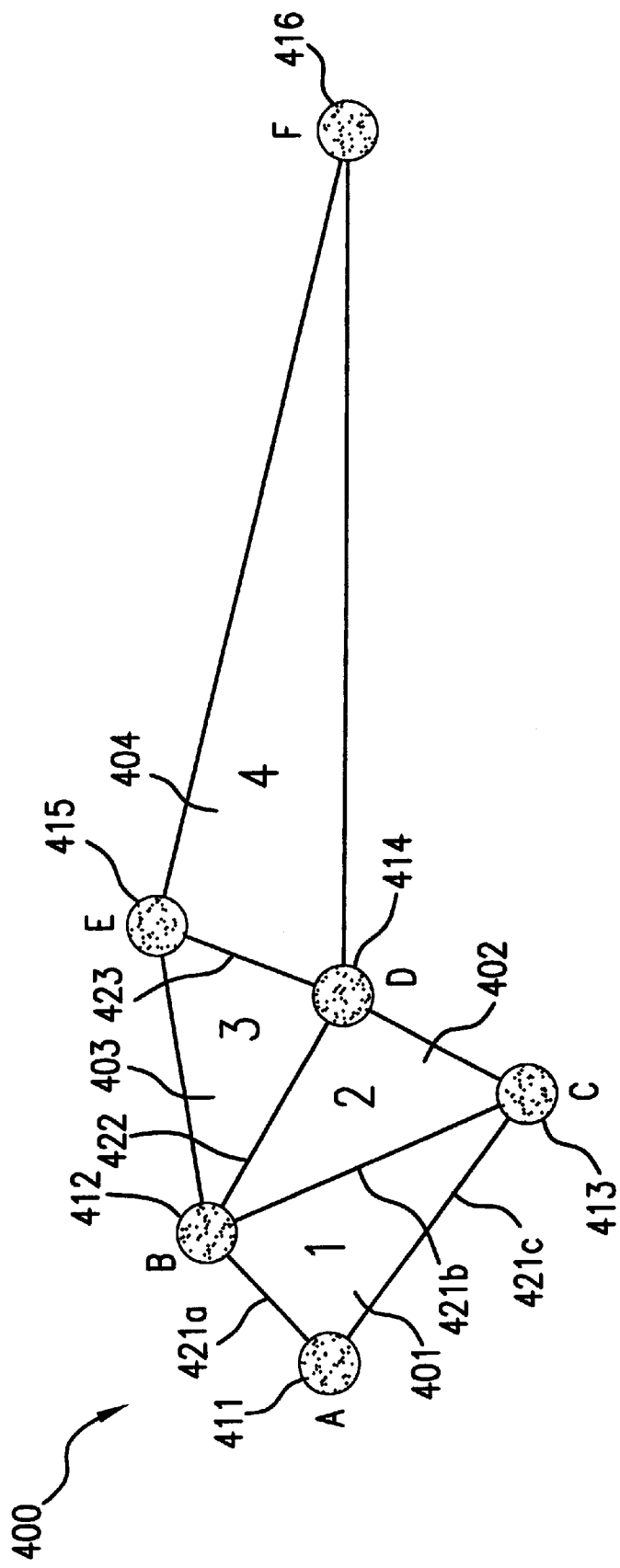
FIG. 4 illustrates another exemplary triangle strip used in accordance with an embodiment of the present invention.

FIG. 4 illustrates an exemplary triangle strip used in accordance with an embodiment of the present invention. Triangle strip 400 includes four triangles 1, 2, 3 and 4 401, 402, 403 and 404, respectively, which are defined by six vertices A, B, C, D, E and F 411, 412, 413, 414, 415 and 416 and nine edges between the six vertices. In FIG. 4, triangle 1 401 includes vertices A, B and C 411, 412 and 413, respectively, and edge 421*a* between vertex A 411 and vertex B 412, edge 421*b* between vertex B 412 and vertex C 413 and edge 421*c* between vertex C 413 and vertex A 411. Edges 421*b*, 422 and 423 are unique in that each one is shared between two adjacent triangles in FIG. 4. For example, edge 421*b* is shared between triangle 1 401 and triangle 2 402; edge 422 is shared between triangle 2 402 and triangle 3 403; and edge 423 is shared between triangle 3 403 and triangle 4 404.

Figure 5A:
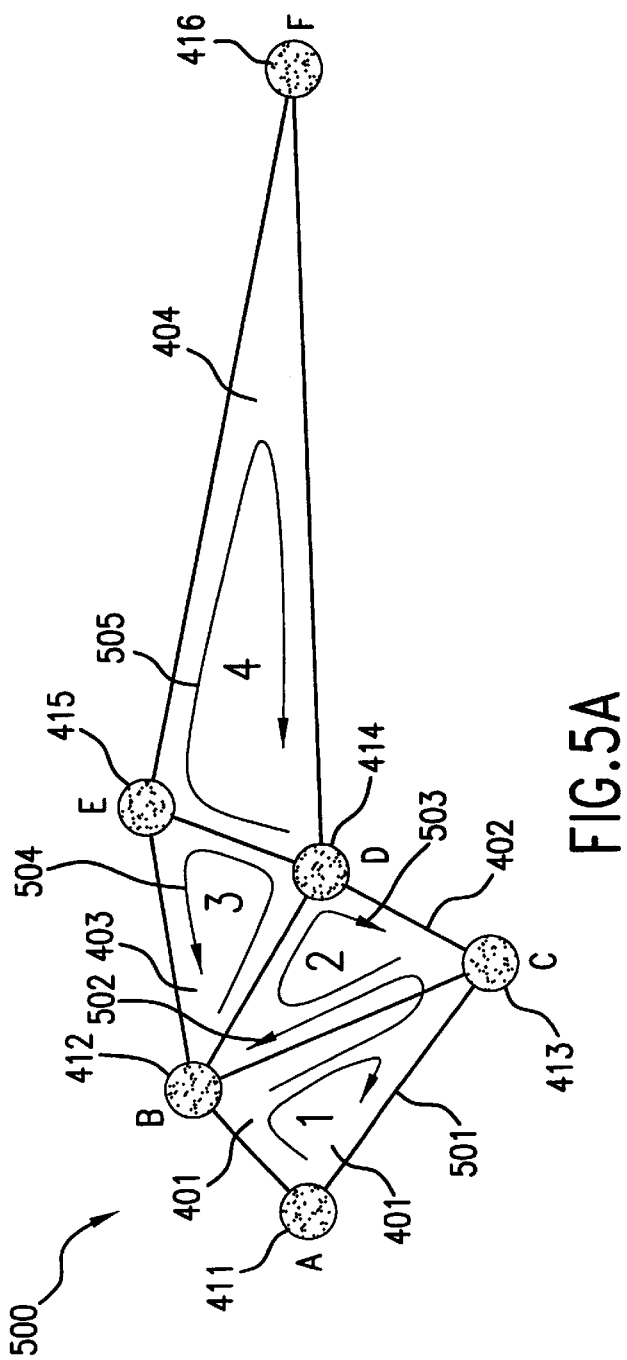
FIG. 5A illustrates the exemplary triangle strip of FIG. 4 showing the clockwise and counter-clockwise ordering of the vertices in the triangle strip in accordance with an embodiment of the present invention.
Figure 5B:
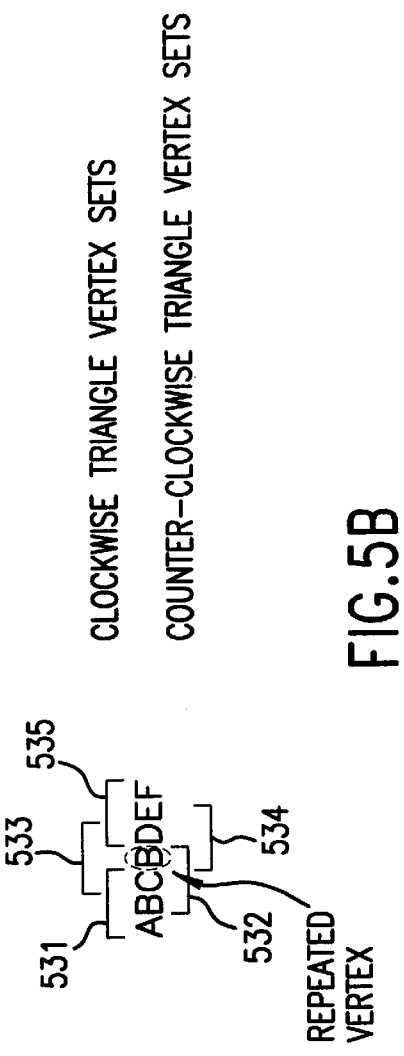
FIG. 5B illustrates a clockwise and counter-clockwise ordering of the vertices in the triangle strip of FIG. 5A with a repeated vertex in accordance with an embodiment of the present invention.

FIG. 5A illustrates an exemplary triangle strip of FIG. 4 showing the clockwise and counter-clockwise ordering of the vertices in the triangle strip in accordance with an embodiment of the present invention. However, unlike the triangle strip of FIG. 3A, the triangles of the triangle strip of FIG. 5A do not inherently exhibit the alternating clockwise and counter-clockwise ordered triangles as required by the dynamic triangle stripping method. Instead, in triangle strip 500, triangle 3 is connected to triangle 2 at the edge between the first and third vertices (that is, vertex B 412 and vertex D 414) of triangle 2 and not the edge between the second and third vertices (that is, vertex B 412 and vertex C 413) as required by the dynamic triangle stripping method. For the sake of consistency and clarity, the numbers used in FIG. 4 have been carried over in FIGS. 5A and 5B. In FIG. 5A vertices A, B and C 411, 412 and 413, respectively, define the three corners of triangle 1 401. Arrow 501 is curved in a clockwise direction to indicate the order that vertices A, B and C 411, 412 and 413, respectively, are stored in the indexed vertex strip shown in FIG. 5B in accordance with an embodiment of the present invention. Bracket 531, shown over "AB C" in FIG. 5B, indicates the first triangle vertex set that defines and determines triangle 1 401 in the triangle strip. Returning to FIG. 5A, arrow 502 is curved in a counter-clockwise direction and indicates the order of vertices B, C and B 412, 413 and 412, respectively, which defines the shared edge between triangle 1 401 and triangle 2 402 and from which the next vertex in the indexed vertex strip is determined. While arrow 502 does not define an actual triangle in the triangle strip, it provides a phantom triangle in the triangle strip to ensure the proper functioning of the triangle strip method. A "phantom" triangle is created by traversing from a first vertex on an edge to the second vertex on the edge and then back to the first vertex. The phantom triangle is created when the "active" edge (that is, the edge between the neighboring triangles) does not have a neighboring triangle in the proper orientation but does have a neighboring triangle oriented in the opposite direction. In this case, the next vertex to be added to the indexed vertex strip in FIG. 5B is vertex B 412. Bracket 532, shown below "BCB" in FIG. 5B, indicates the second triangle vertex set that defines and determines the phantom triangle in the triangle strip. Returning to FIG. 5A, arrow 503 is curved in a clockwise direction and indicates the order of vertices C, B and D 413, 412 and 414, respectively, which define the corners of triangle 2 402 and from which the next vertex in the indexed vertex strip is determined. In this case, the next vertex to be added to the indexed vertex strip in FIG. 5B is vertex D 414. Bracket 533, shown above "CBD" in FIG. 5B, indicates the third triangle vertex set that defines and determines triangle 2 402 in the triangle strip. Returning to FIG. 5A, arrow 504 is curved in a counter-clockwise direction and indicates the order of vertices B, D and E 412, 414 and 415, respectively, which define the corners of triangle 3 403 and from which the next vertex in the indexed vertex strip is determined. In this case, the next vertex to be added to the indexed vertex strip in FIG. 5B is vertex E 415. Bracket 534, shown below "BDE" in FIG. 5B, indicates the fourth triangle vertex set that defines and determines triangle 3 403 in the triangle strip. Returning to FIG. 5A, arrow 505 is curved in a clockwise direction and indicates the order of vertices 414, 415 and 416 D, E and F, respectively, which define the corners of triangle 4 404 and from which the next vertex in the indexed vertex strip is determined. In this case, the next vertex to be added to the indexed vertex strip in FIG. 5B is vertex F 416 Bracket 535, shown above "DEF" in FIG. 5B, indicates the fifth triangle vertex set that defines and determines triangle 4 404 in the triangle strip.

Figure 6:
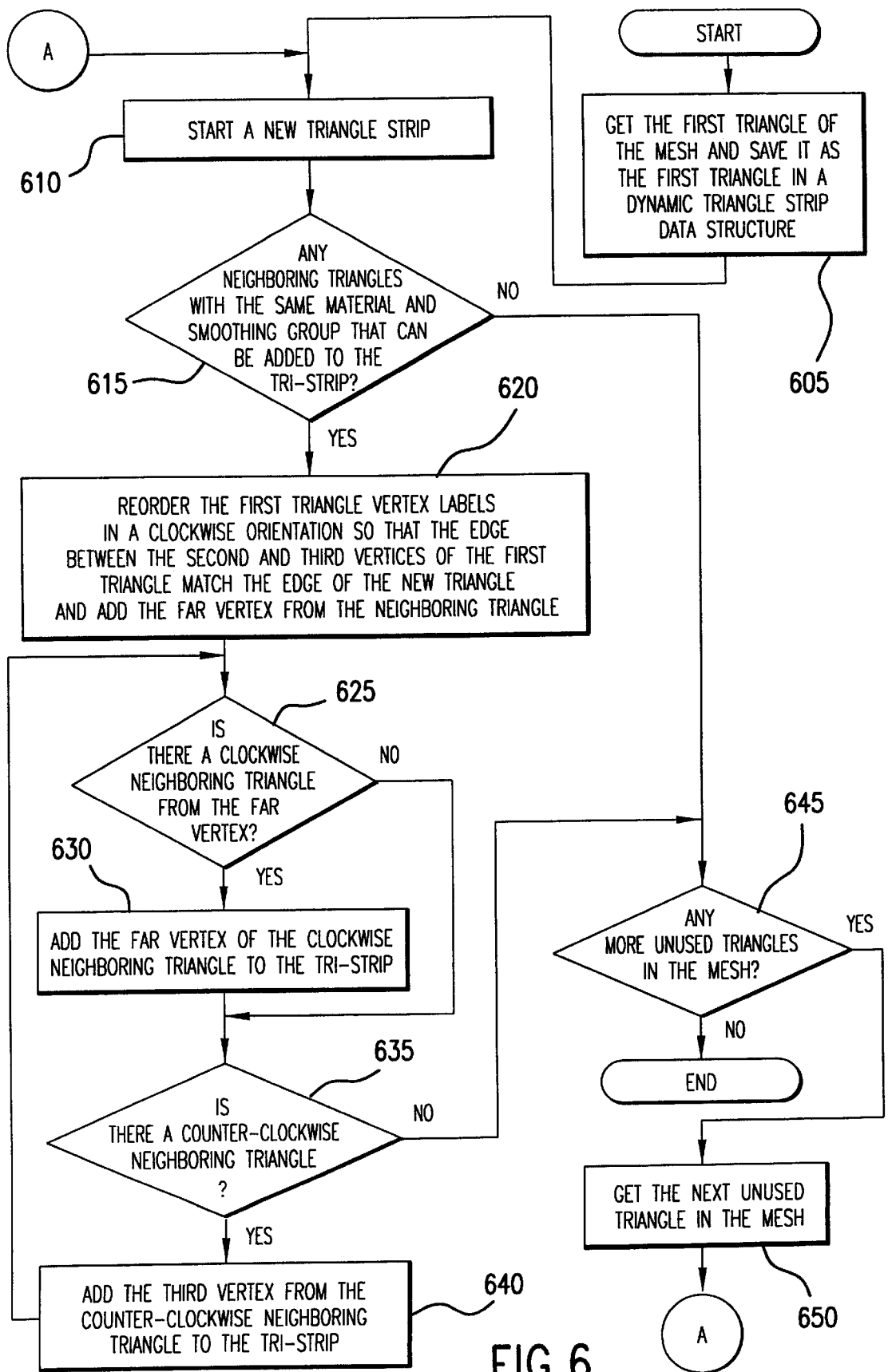
FIG. 6 is a logic flow diagram for the dynamic triangle stripping method in accordance with an embodiment of the present invention.
Figure 7:
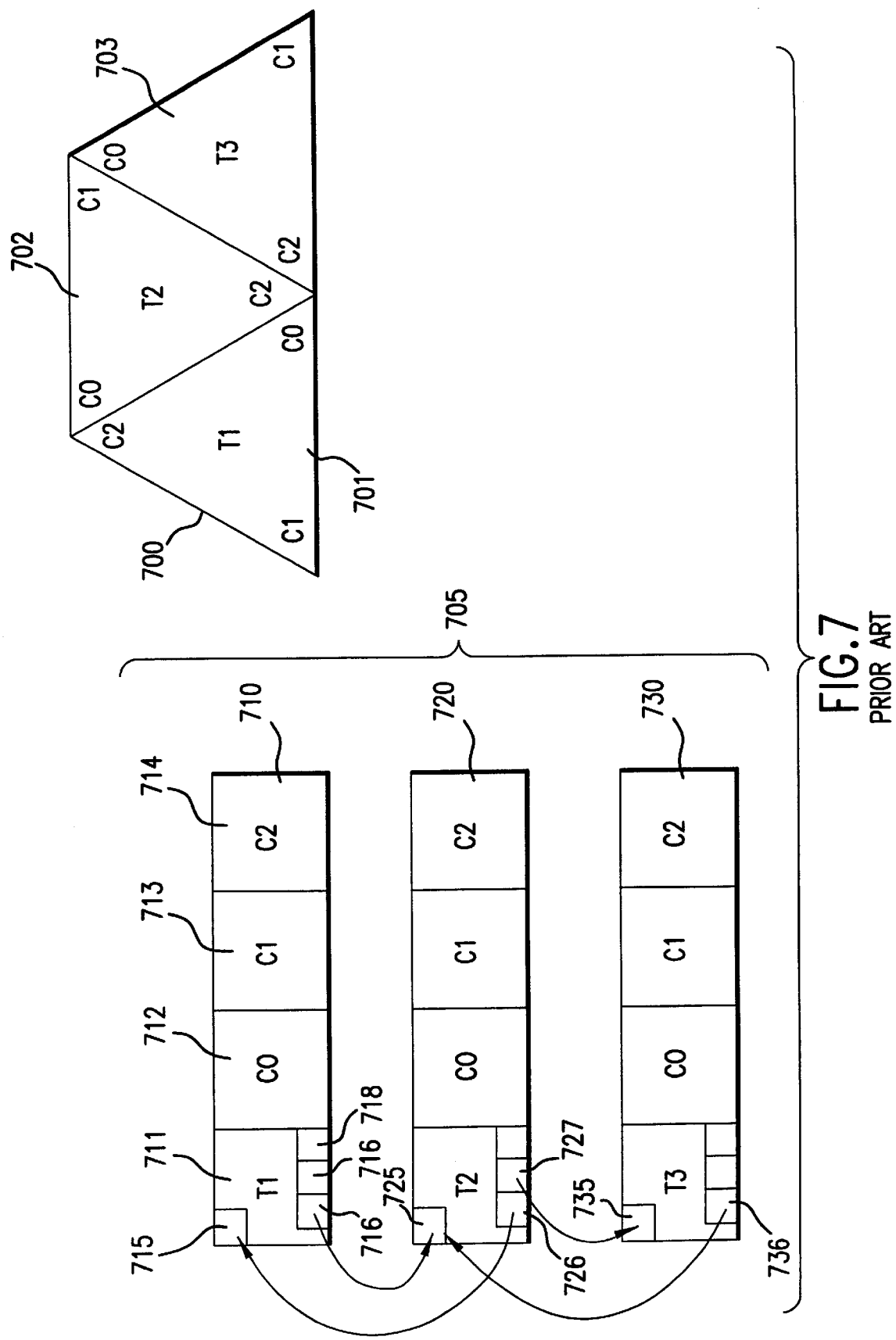
FIG. 7 is a block diagram representation of a standard prior art triangle strip data structure.

FIG. 6 illustrates a logic flow diagram of the dynamic triangle stripping method and system in accordance with an embodiment of the present invention. In block 605, the first triangle in a multi-resolution neighbor mesh data structure is read and added to a dynamic triangle strip data structure as the first triangle. In block 610, a new triangle strip is created with the first triangle read in block 605 or the next unused triangle read in block 650. In block 615, the multi-resolution neighbor mesh data structure is checked to determine if the first triangle has any neighboring triangles with the same material and smoothing group characteristics that can be added to the triangle strip. If there are no neighboring triangles, then processing transfers to block 645. If a neighboring triangle with the same material and smoothing group characteristics is found in block 615, then in block 620 the vertex labels in the first triangle are reordered in a clockwise orientation so that the edge between the second and third vertices of the first triangle is shared with the neighbor triangle and the far vertex of the neighbor triangle is added at the end of the dynamic triangle strip data structure. In block 625, the multi-resolution neighbor mesh data structure is checked for a clockwise neighboring triangle from the last vertex in the dynamic triangle strip data structure, which is the just added far vertex of the neighbor triangle. If a clockwise neighboring triangle is not found in block 625, then processing transfers to block 635. If a clockwise neighboring triangle is found in block 625, then in block 630, the far vertex from the found clockwise neighboring triangle is added at the end of the dynamic triangle strip data structure. In block 635, the multi-resolution neighbor mesh data structure is checked for a counter-clockwise neighboring triangle from the last vertex in the dynamic triangle strip data structure. If a counter-clockwise neighboring triangle is not found in block 635, then processing transfers to block 645. If a clockwise neighboring triangle is found in block 635, then in block 640, the far vertex from the found counter-clockwise neighboring triangle is added at the end of the dynamic triangle strip data structure and processing loops back to block 625. In block 645, the multi-resolution neighbor mesh data structure is checked to determine if there are any more unused triangles in the multi-resolution neighbor mesh data structure. If no unused triangles are found in block 645, then processing terminates. If unused triangles are found in block 645, then in block 650 the next unused triangle is read from the multi-resolution neighbor mesh data structure and processing loops back to block 610 and processing continues as described above.

Figure 8:
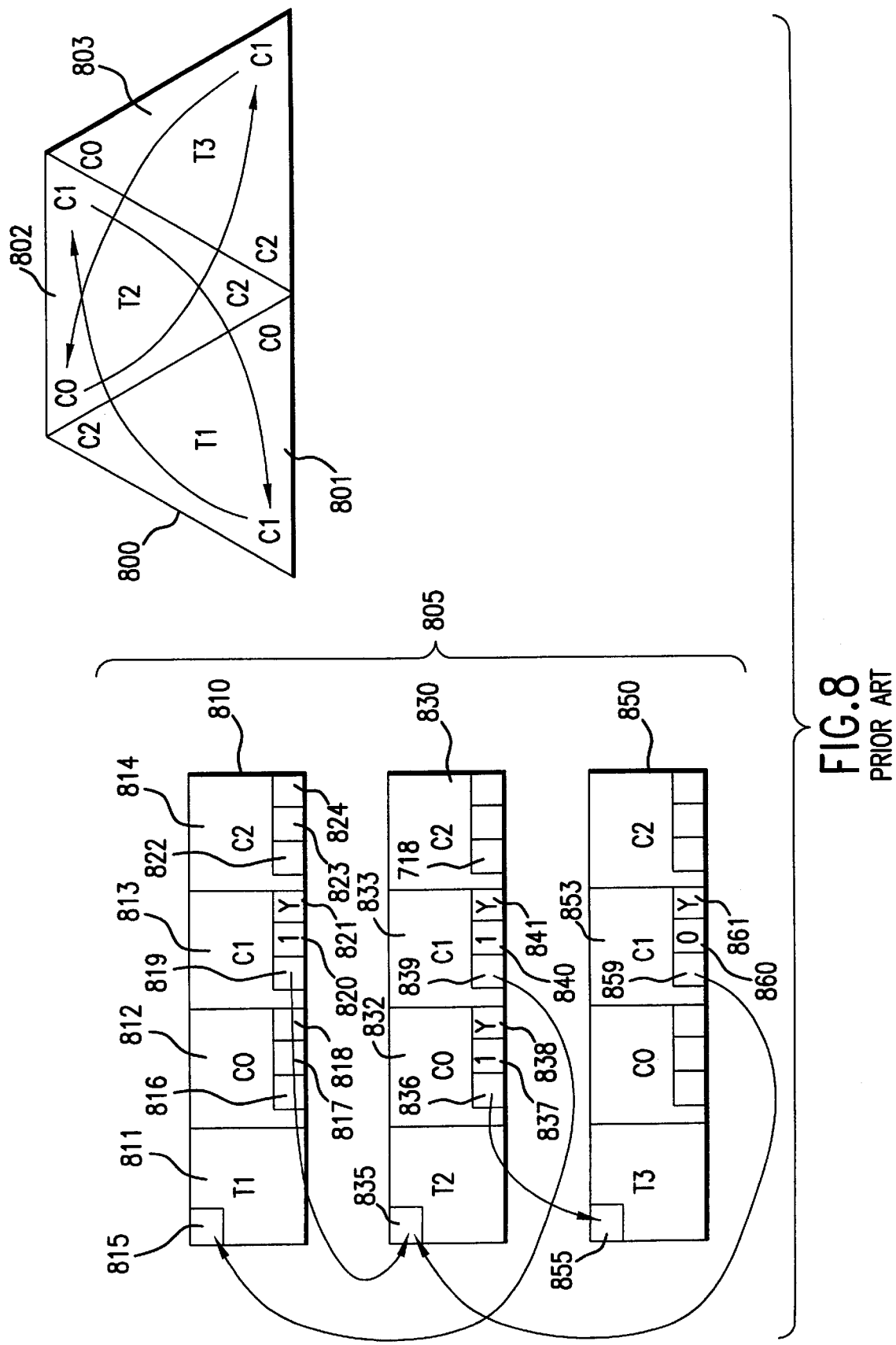
FIG. 8 is a block diagram representation of the dynamic triangle strip data structure in accordance with an embodiment of the present invention.

FIG. 8 is a block diagram representation of the dynamic triangle strip data structure in accordance with an embodiment of the present invention. In FIG. 8, an exemplary three-triangle triangle strip 800 of an embodiment of the present invention is shown with the comers of each triangle 801, 802 and 803 labeled as C0, C1 and C2. A triangle strip data structure 805 illustrates the interrelationships between and the data structure of triangle records 810, 830 and 850 which represent triangles T1, T2 and T3, respectively, of triangle strip 800. Triangle record 810 is comprised of a record header 815, a triangle number field 811, a comer C0 field 812, a comer C1 field 813 and a corner C2 field 814. Each of the corner fields 812, 813 and 814 have a pointer to the neighboring triangle that contains the far comer from the corner field 816, 819 and 822, respectively; an index value 817, 820 and 823 for the far comer pointed to by the pointers 816, 819 and 822, respectively; and a flag 818, 821 and 824, respectively, indicating each triangle's tri-strip compatibility, for example, material and smoothing group compatibility, with the respective pointed to neighboring triangle. While flags 818, 821 and 824 are shown as part of each comer 812, 813 and 814, respectively, in FIG. 8, an alternate embodiment of the present invention is contemplated in which flags 818, 821 and 824 are not used. In this embodiment since only one material and smoothing group is used, all of the triangles are compatible and the flags become unnecessary. Conversely, if additional compatibility measures are required, for example, to texture discontinuity information, for a particular application, alternate embodiments of the present invention are contemplated which include additional flag fields, for each separate compatibility measure, are part of each comer field. While not specifically described herein, triangle records 830 and 850 are comprised of structures similar to those described above for triangle record 810.

In FIG. 8, each corner field has three associated elements, for example, for corner C0 field 812, these associated elements are the pointer 816, index element 817, and flag element 818. The pointer 816 points to the neighbor triangle that contains the far corner from corner C0 field 812. In FIG. 8, the pointer 816 is shown as a null pointer, since there is not a neighbor triangle with a far comer related to corner C0 field 812. The index element 817 contains an index value which specifies the far comer of the neighboring triangle pointed to by pointer 816 and flag element 818 indicates triangle T1's 801 triangle strip compatibility. Similar to pointer 816, the index element 817 and flag element 818 are both null values. In contrast, comer C1 field 813 of triangle record T1 810 has a triangle pointer 819 which points to the record header 835 of triangle record T2 830. Corner C1 field 813 of triangle record T1 810 also has an index value 820 of 1 which specifies that the far comer of neighbor triangle T2 802 is C1. As shown by the arrows in triangle strip 800, comer C1 of triangle T1 801 is the far comer of comer C1 of triangle T2 802 and, similarly, corner C1 of triangle T2 802 is the far comer of T1 801. Flag element 821 of corner field C1 813 is shown with a logical "yes" to indicate that triangle record T1 810 is compatible with the next triangle record T2 830 in triangle strip 800. Likewise, in corner C1 field 833 in triangle record T2 830, the pointer 839 points to record header 815 of triangle record T1 810; the index element 840 value of 1 correctly indicates corner C1 field 812 as the far corner, and the flag element 841 agrees with flag element 821 from triangle record T1 810 that triangles T1 801 and T2 802 are compatible.

A similar relationship is illustrated by comer C0 field 832 of triangle record T2 830 and corner C1 field 853 of triangle record T3 850. Pointer 836 of comer C0 field 832 of triangle record T2 830 points to record header 855 of triangle record T3 850; index value 837 of comer C0 field 832 has a value of 1 to indicate that comer C1 field 853 of triangle record T3 850 is the far corner; and the flag element 838 logical "yes" value indicates triangles T2 802 and T3 803 are compatible. Likewise, pointer 859 of comer C1 field 853 of triangle record T3 850 points to record header 835 of triangle record T2 830; index value 860 of comer C1 field 853 has a value of 1 to indicate that corner C0 field 832 of triangle record T2 830 is the far corner; and the flag element 861 logical "yes" value also indicates that triangles T2 802 and T3 803 are compatible.

In embodiments of the present invention, as triangles are added and deleted from the triangle strip, triangle records are easily added and deleted from the triangle strip data structure by changing where the pointers point. These additions and deletions do not cause the actual structure of the triangle strip data structure to be changed.

Figure 9:
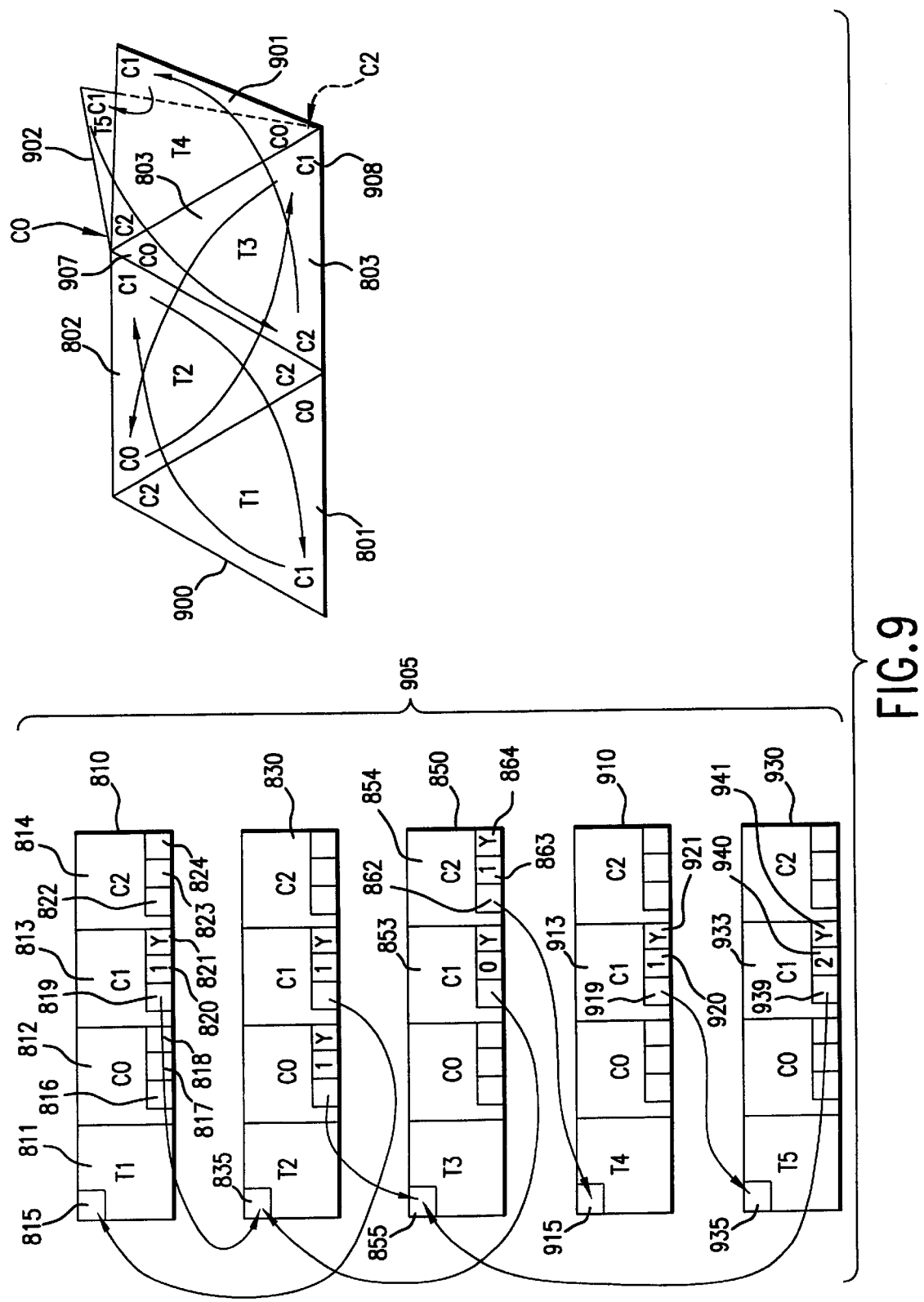
FIG. 9 is a block diagram representation of a non-manifold dynamic triangle strip data structure in accordance with an embodiment of the present invention.

FIG. 9 is a block diagram representation of an embodiment of the dynamic triangle strip data structure of FIG. 8 that has been modified to illustrate a non-manifold mesh in accordance with the present invention. A "non-manifold" mesh is a mesh that has some edges which are shared by more than two triangles of the mesh. In FIG. 9, an exemplary five-triangle non-manifold triangle strip 800 of an embodiment of the present invention is shown with the corners of each triangle 801, 802, 803, 901 and 902 labeled as C0, C1 and C2. A triangle strip data structure 905 illustrates the interrelationships between and the data structure of triangle records 810, 830, 850, 910 and 930 which represent triangles T1, T2, T3, T4 and T5, respectively, of triangle strip 900. Triangle records 810, 830, 850, 910 and 930 are comprised of structures similar to those described above for triangle record 810 in FIG. 8. No change to the data structure is required to represent a non-manifold mesh, either in combination with or separate from a manifold mesh.

As in FIG. 8, in FIG. 9, each corner field has three associated elements, for example, for corner C0 field 812, these associated elements are a pointer 816, an index element 817, and a flag element 818. Triangle records 810, 830 and 850 are as described above in relation to FIG. 8. In FIG. 9, non-manifold triangle strip 900 shows triangles T4 901 and T5 902 sharing the edged between corners C0 907 and C1 908 of triangle T3 803. New triangle records T4 910 and T5 930 have been added to the triangle strip data structure 805 of FIG. 8 to form a non-manifold triangle strip data structure 905 in FIG. 9. As a result, corner field C2 854 of triangle record T3 850 has been updated to reflect that triangle T4 901 is now a neighbor of triangle T3 803. The pointer 862 now points to record header 915 of triangle record T2 910; the index value 863 has a value of 1 to indicate that the far corner in neighboring triangle T4 910 is corner C1; and the flag element is a logical "yes" indicating that triangles T3 803 and T4 901 are in the same smoothing group. Similarly, for triangle record T4 910, record header 915 is being pointed to by pointer 862 from triangle record T3 850 and corner field C1 913 contains the information on the nearest neighbor triangle record to triangle record T4 910. In corner field C1 913, pointer 919 is pointing to the record header 935 of triangle record T5 930; the index value 920 has a value of 1 to indicate that the far corner in neighboring triangle T5 930 is corner C1; and the flag element is a logical "yes" indicating that triangles T4 910 and T5 930 are in the same smoothing group. Continuing with triangle record T5 930, record header 935 is being pointed to by pointer 919 from triangle record T4 910 and corner field C1 933 contains the information on the nearest neighbor triangle record to triangle record T5 930. In corner field C1 933, pointer 939 is pointing to the record header 955 of triangle record T3 850; the index value 940 has a value of 2 to indicate that the far corner in neighboring triangle T3 803 is corner C2; and the flag element is a logical "yes" indicating that triangles T5 930 and T3 803 are in the same smoothing group.

In other embodiments, (not shown) additional flags can be implemented to indicate triangle material, texture and texture discontinuities. A "texture discontinuity" occurs when a crease or a seam exists in the texture covering the triangle. Flags can also be implemented to indicate different texture smoothing groups. A "smoothing" group is where a vertex contains more than one normal. A face with a vertex with more than one normal is in one smoothing group and a neighbor face with the other normal of the vertex is in another smoothing group. Finally, flags can be implemented for texture seams. "Texture seams" occur where a vertex contains multiple texture coordinates.

In addition to the above described functions, the triangle strip data structure can be used to quickly find silhouette edges of a mesh. This is extremely useful for outlining objects, for example, cartoon characters. Similarly, the triangle strip data structure can be used to implement the MRM algorithm during edge collapse in the author phase. Likewise, the triangle strip data structure can be used to subdivide each triangle into four triangles during the playback phase.

Another embodiment of the neighbor mesh data structure can be used in general 3-D programming without triangle strips. For example, the data structure can be used to represent non-manifold meshes. To represent the non-manifold mesh the pointers in the data structure are arranged so they loop through all the faces sharing the same edge.

In accordance with embodiments of the present invention, a variety of computer systems can be used with the present invention. The following examples of representative architecture embodiments of the computer systems that can be used with the present invention are merely meant to be illustrative and should not be construed as limiting the scope or extent of the available systems which can be used. For example, a simplified embodiment of a computer system that can be used with embodiments of the present invention includes a processing component coupled to a memory component. The processing component and memory component operate to enable storing and executing computer-executable code, storing the MRM and storing the neighbor mesh which is created when the processing component reads and executes the computer-executable code, reads the MRM, and creates and stores the neighbor mesh and stores in the memory component. The processing component can be of any type of architecture, such as a complex instruction set computer ("CISC"), reduced instruction set computer ("RISC"), hybrid, or multi-processor architecture. Similarly, the memory component can have multiple embodiments, for example in one embodiment, the memory component can include separate RAM, DRAM and cache memories in which the processing and storing of the computer-executable code, MRM and neighbor mesh variously occurs.

In one embodiment of a computer system for use with the present invention, the computer system is a conventional desktop personal computer ("PC") system. In this conventional PC system the processing component includes a central processing unit ("CPU") for executing the computer-executable code coupled to a conventional PC chipset, which controls the CPU's access to and from the memory component. The memory component includes a Random Access Memory ("RAM") main system memory for executing the computer-executable code coupled to the chipset for temporary storage of the computer-executable computer code, the MRM and the neighbor mesh. The memory component also includes a hard disk storage system also coupled to the chipset for permanent storage of the permanent storage of the computer-executable computer code, the MRM and the neighbor mesh.

The disclosed embodiments are illustrative of the various ways in which the present invention may be practiced. Other embodiments can be implemented by those skilled in the art without departing from the spirit and scope of the present invention. Accordingly, all such embodiments which fall within the spirit and the broad scope of the appended claims will be embraced by the principles of the present invention.

What is claimed is:

1. A method of creating a neighbor mesh from a multi-resolution mesh, said method comprising:

computing neighbor data for the neighbor mesh at a highest resolution of the multi-resolution mesh;

changing the resolution of the multi-resolution mesh and re-computing the neighbor data for the neighbor mesh at the changed resolution of the multi-resolution mesh; and computing an updated neighbor mesh from the re-computed neighbor data.

2. The method of claim 1, wherein said computing an updated neighbor mesh from the re-computed neighbor data further comprises:

computing the updated neighbor mesh at rates at least as fast as 60 hertz.

3. The method of claim 1, further comprising:

rendering the updated neighbor mesh at rates at least as fast as 60 hertz.

4. The method of claim 1, wherein computing an updated neighbor mesh from the re-computed neighbor data comprises:
   reading a first triangle in the neighbor mesh;
   saving the first triangle in a triangle strip;
   until there are no more unused triangles in the neighbor mesh, performing the following:
   (1) determining if there are any neighboring triangles to the first triangle that can be added to the triangle strip;
   (2) if there are no neighboring triangles, then ending the triangle strip and going to (7);
   (3) if there is a neighboring triangle, then reordering a first vertex, a second vertex and a third vertex of the first triangle in a clockwise orientation so that the edge of the second and third vertex match the edge of the neighboring triangle and adding a far vertex of the neighboring triangle to the triangle strip;
   (4) getting the added far vertex and selecting the clockwise neighboring triangle from the added far vertex and, if there is a clockwise neighboring triangle, then
      (a) adding a far vertex of the clockwise neighboring triangle to the triangle strip;
      (b) finding a counter-clockwise neighboring triangle from the added far vertex of the clockwise neighboring triangle; and
      (c) adding a far vertex of the found counter-clockwise neighboring triangle to the triangle strip;
   (5) if there is no clockwise neighboring triangle in (4), then checking for a counter-clockwise neighboring triangle and, if found,
      (a) repeating the second to last far vertex in the triangle strip at the end of the triangle strip;
      (b) finding a clockwise neighboring triangle from the repeated second to last vertex; and
      (c) adding the far vertex of the clockwise neighboring triangle to the triangle strip;
   (6) repeating (4) and (5) for each of the neighboring triangles that can be added to the triangle strip; and
   (7) ending the triangle strip and getting a new first triangle from the neighbor mesh to start a next triangle strip.

5. The method of claim 1, wherein the neighbor data for a vertex of a triangle in the neighbor mesh comprises:
   a pointer to a neighbor triangle with a far corner;
   an index value of a far corner of the neighbor triangle; and
   a flag indicating if the neighbor triangle has the same material and smoothing group characteristics as the triangle.

6. A computer-readable medium having stored therein computer-executable code for creating a neighbor mesh from a multi-resolution mesh comprising:
   computing neighbor data for the neighbor mesh at a highest resolution of the multi-resolution mesh;
   changing the resolution of the multi-resolution mesh and re-computing the neighbor data for the neighbor mesh at the changed resolution of the multi-resolution mesh; and
   computing an updated neighbor mesh from the re-computed neighbor data.

7. The computer-readable medium of claim 6, wherein said computing an updated neighbor mesh from the re-computed neighbor data further comprises:
   computing the updated neighbor mesh at rates at least as fast as 60 hertz.

8. The computer-readable medium of claim 6, further comprising: rendering the updated neighbor mesh at rates at least as fast as 60 hertz.

9. The computer-readable medium of claim 6, wherein computing an updated neighbor mesh from the re-computed neighbor data comprises:
   reading a first triangle in the neighbor mesh;
   saving the first triangle in a triangle strip;
   until there are no more unused triangles in the neighbor mesh, performing the following:
   (1) determining if there are any neighboring triangles to the first triangle that can be added to the triangle strip;
   (2) if there are no neighboring triangles, then ending the triangle strip and going to (7);
   (3) if there is a neighboring triangle, then reordering a first vertex, a second vertex and a third vertex of the first triangle in a clockwise orientation so that the edge of the second and third vertex match the edge of the neighboring triangle and adding a far vertex of the neighboring triangle to the triangle strip;
   (4) getting the added far vertex and selecting the clockwise neighboring triangle from the added far vertex and, if there is a clockwise neighboring triangle, then,
      (a) adding a far vertex of the clockwise neighboring triangle to the triangle strip;
      (b) finding a counter-clockwise neighboring triangle from the added far vertex of the clockwise neighboring triangle; and
      (c) adding a far vertex of the found counter-clockwise neighboring triangle to the triangle strip;
   (5) if there is no clockwise neighboring triangle in (4), then checking for a counter-clockwise neighboring triangle and, if found,
      (a) repeating the second to last far vertex in the triangle strip at the end of the triangle strip;
      (b) finding a clockwise neighboring triangle from the added far vertex of the clockwise neighboring triangle; and
      (c) adding the far vertex of the clockwise neighboring triangle to the triangle strip;
   (6) repeating (4) and (5) for each of the neighboring triangles that can be added to the triangle strip; and
   (7) ending the triangle strip and getting a new first triangle from the high-resolution mesh to start a next triangle strip.

10. A computer-readable medium having stored therein a data structure for a dynamic triangle strip, said data structure comprising the following fields:
   a record header delineating the beginning of a first triangle record;
   a triangle number field for said first triangle record;
   a first corner data component;
   a second corner data component;
   a third corner data component; and
   said first, second and third corner data components contain data describing a triangle represented by said first triangle record, said data including:
      a pointer to a record header of a second triangle record for a neighboring triangle with a far corner, and
      an index value for the far corner in the second triangle record pointed to by the pointer.

11. The data structure of claim 10, wherein each of said first, second and third corner data components further comprise:

at least one flag indicating the triangle record's triangle strip compatibility with the neighboring triangle.

12. The data structure of claim 11, wherein the corner header of a first triangle record is referenced by the index value of a corner data component in a neighboring triangle record that is pointing to the first triangle record.

13. The data structure of claim 11, wherein the pointer to a neighboring triangle with a far corner points to only one neighboring triangle.

14. The data structure of claim 11, wherein the dynamic triangle strip data structure represents at least one of a manifold triangle data structure and a non-manifold triangle data structure.

15. A method for computing an updated dynamic triangle strip from a neighbor mesh, said method comprising:

reading a first triangle in the neighbor mesh;

saving the first triangle in a triangle strip;

until there are no more unused triangles in the neighbor mesh, performing the following:
   (1) determining if there are any neighboring triangles to the first triangle that can be added to the triangle strip;
   (2) if there are no neighboring triangles, then ending the triangle strip and going to (7);
   (3) if there is a neighboring triangle, then reordering a first vertex, a second vertex and a third vertex of the first triangle in a clockwise orientation so that the edge of the second and third vertex match the edge of the neighboring triangle and adding a far vertex of the neighboring triangle to the triangle strip;
   (4) getting the added far vertex and selecting the clockwise neighboring triangle from the added far vertex and, if there is a clockwise neighboring triangle, then,
      (a) adding a far vertex of the clockwise neighboring triangle to the triangle strip;
      (b) finding a counter-clockwise neighboring triangle from the added far vertex of the clockwise neighboring triangle; and
      (c) adding a far vertex of the found counter-clockwise neighboring triangle to the triangle strip;
   (5) if there is no clockwise neighboring triangle in (4), then checking for a counter-clockwise neighboring triangle and, if found,
      (a) repeating the second to last far vertex in the triangle strip at the end of the triangle strip;
      (b) finding a clockwise neighboring triangle from the added far vertex of the clockwise neighboring triangle; and
      (c) adding the far vertex of the clockwise neighboring triangle to the triangle strip;
   (6) repeating (4) and (5) for each of the neighboring triangles that can be added to the triangle strip; and
   (7) ending the triangle strip and getting a new first triangle from the high-resolution mesh to start a next triangle strip.

16. The method claim 15, wherein determining if there are any neighboring faces comprises:

determining if there is at least one neighboring face to the first triangle; and if there is at least one neighboring face, determining if the at least one neighboring face has the same material and smoothing group as the first triangle.

17. A computer-readable medium having stored therein computer-executable code for performing the steps of:

reading a first triangle in the multi-resolution mesh;

saving the first triangle in a triangle strip;

until there are no more unused triangles in the neighbor mesh, performing the following:
   (1) determining if there are any neighboring triangles to the first triangle that can be added to the triangle strip;
   (2) if there are no neighboring triangles, then ending the triangle strip and going to (7);
   (3) if there is a neighboring triangle, then reordering a first vertex, a second vertex and a third vertex of the first triangle in a clockwise orientation so that the edge of the second and third vertex match the edge of the neighboring triangle and adding a far vertex of the neighboring triangle to the triangle strip;
   (4) getting the last vertex added to the triangle strip and selecting the clockwise neighboring triangle from that vertex and, if there is a clockwise neighboring triangle, then
      (a) adding a far vertex of the clockwise neighboring triangle to the triangle strip;
      (b) finding a counter-clockwise neighboring triangle from the added far vertex of the clockwise neighboring triangle; and
      (c) adding a far vertex of the found counter-clockwise triangle to the triangle strip;
   (5) if there is no clockwise neighboring triangle in (4), then checking for a counter-clockwise neighboring triangle and, if found,
      (a) repeating the second to last vertex in the triangle strip at the end of the triangle strip;
      (b) finding a clockwise neighboring triangle from the repeated second to last vertex; and
      (c) adding the far vertex of the clockwise triangle to the triangle strip;
   (6) repeating (4) and (5) for each of the neighboring triangles that can be added to the triangle strip; and
   (7) ending the triangle strip and getting a new first triangle from the high-resolution mesh to start a next triangle strip.

18. The computer-readable medium of claim 17, wherein determining if there are any neighboring faces step comprises:

determining if there is at least one neighboring face to the first triangle; and if there is at least one neighboring face, determining if the at least one neighboring face has the same material and smoothing group as the first triangle.

19. An apparatus for creating a neighbor mesh from a multi-resolution mesh (MRM) comprising:

a processing component;

a memory component coupled to said processing component for storing computer-executable code, the MRM and the neighbor mesh;

wherein said processing component reads the computer-executable code from said memory component, executes the computer-executable code, reads the MRM from said memory component, creates the neighbor mesh and stores the neighbor mesh in said memory component.

20. A system for creating a neighbor mesh from a multi-resolution mesh (MRM) comprising:

a processor;

a first component coupled to said processor for computing neighbor data for the neighborhood mesh at the highest resolution of the multi-resolution mesh;

a second component coupled to said processor for changing the resolution of the multi-resolution mesh and re-computing the neighbor data for the neighbor mesh at the changed resolution of the multi-resolution mesh; and a third component coupled to said processor for computing and rendering an updated neighbor mesh from the re-computed neighbor data;

wherein said processor controls the operation of each of said first, second and third components.

* * * * *

UNITED STATES PATENT AND TRADEMARK OFFICE
CERTIFICATE OF CORRECTION

PATENT NO. : 6,515,660 B1  
DATED : February 4, 2003  
INVENTOR(S) : Marshall et al.

It is certified that error appears in the above-identified patent and that said Letters Patent is hereby corrected as shown below:

Column 15,
Lines 6, 8 and 11, change "comer" to -- corner --.

Column 16,
Line 57, change "component;" to -- component; and --.
Line 62, delete "wherein".
Line 62, change "component reads" to -- component to read --.
Line 64, change "executes" to -- execute --.
Line 64, change "reads" to -- read --.
Line 65, change "creates" to -- create --.
Line 66, change "stores" to -- store --.

Column 18,
Line 6, delete "wherein".
Line 6, change "processor controls" to -- processor to control --.

Signed and Sealed this

Thirtieth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,515,660 B1  
DATED : February 4, 2003  
INVENTOR(S) : Carl S. Marshall et al.

It is certified that error appears in the above-identified patent and that said Letters Patent is hereby corrected as shown below:

<u>Title page,</u>  
Item [75], Inventors, change name of the second inventor "Michael S. MacPherson" to -- Michael B. MacPherson --

Signed and Sealed this

Sixth Day of April, 2004

JON W. DUDAS  
*Acting Director of the United States Patent and Trademark Office*